US012676493B2

(12) United States Patent
    Juzang

(10) Patent No.: US 12,676,493 B2
(45) Date of Patent: Jul. 7, 2026

(54) CHARGING STATIONS

(71) Applicant: Combined Public Communications, Highland Heights, KY (US)

(72) Inventor: Dennis Juzang, Highland Heights, KY (US)

(73) Assignee: Combined Public Communications, LLC, Cold Spring, KY (US)

( * ) Notice: Subject to any disclaimer, the term of this patent is extended or adjusted under 35 U.S.C. 154(b) by 864 days.

(21) Appl. No.: 17/829,772

(22) Filed: Jun. 1, 2022

(65) Prior Publication Data

US 2022/0385083 A1 Dec. 1, 2022

Related U.S. Application Data

(60) Provisional application No. 63/195,252, filed on Jun. 1, 2021.

(51) Int. Cl.
    *H02J 7/47* (2026.01)
    *H02J 7/50* (2026.01)
    *H02J 7/70* (2026.01)
    *H04B 5/79* (2024.01)

(52) U.S. Cl.
    CPC ................ *H02J 7/751* (2026.01); *H02J 7/47* (2026.01); *H02J 7/50* (2026.01); *H04B 5/79* (2024.01)

(58) Field of Classification Search
    CPC ..... H02J 7/751; H02J 7/47; H02J 7/50; H04B 5/79
    USPC .................................................. 320/107, 115
    See application file for complete search history.

(56) References Cited

U.S. PATENT DOCUMENTS

| | | | |
|---|---|---|---|
| 9,324,204 B2 | 4/2016 | Naghi et al. | |
| 9,373,967 B1 * | 6/2016 | Sullivan ................. | H04N 7/188 |
| 10,283,984 B2 * | 5/2019 | Maguire ................. | H02J 7/731 |
| 10,467,836 B1 | 11/2019 | Kirchhausen | |
| 10,474,797 B2 | 11/2019 | Lowenthal et al. | |
| 12,068,625 B1 * | 8/2024 | Shipman, Jr. ........... | G06F 21/32 |
| 2012/0078413 A1 | 3/2012 | Baker, Jr. | |
| 2013/0132307 A1 | 5/2013 | Phelps et al. | |
| 2015/0207352 A1 * | 7/2015 | Lykov ..................... | H02J 7/731 |
| | | | 320/107 |
| 2019/0027944 A1 * | 1/2019 | Grzybowski ............. | H02J 7/00 |

(Continued)

FOREIGN PATENT DOCUMENTS

| | | |
|---|---|---|
| GB | 2528818 | 2/2016 |
| WO | 2020065559 | 4/2020 |

OTHER PUBLICATIONS

"Computeit™ Laptop Storage & CHARGING", Ristech, https://www.ristech.com/library-solutions/computeit-laptop-storage-charging/, retrieved May 31, 2022, 8 pages.

(Continued)

*Primary Examiner* — Richard V Muralidar
(74) *Attorney, Agent, or Firm* — Porter Wright Morris & Arthur LLP

(57) ABSTRACT

An example charging station can include a frame with bays and modular charging units. The modular charging units can include a connector, a locking mechanism, and an actuator. The actuator can include a member that is movable between a first position at which the member is not in physical contact with the locking mechanism and a second position at which the member is in physical contact with the locking mechanism.

20 Claims, 8 Drawing Sheets

(56) References Cited

U.S. PATENT DOCUMENTS

2021/0287197 A1* 9/2021 Best ..................... G06Q 20/206

OTHER PUBLICATIONS

"AC-LOCKER-24-RFID", Anywhere Cart, https://www.anywherecart.com/products/ac-locker-24-rfid/, retrieved May 31, 2022, 4 pages.
"Zioxi BYOD Laptop Charging Lockers", Zioxi, https://www.zioxi.com/product/byod-laptop-charging-lockers/, retrieved May 31, 2022, 20 pages.
"TechGuard Connect®—10 Bay", Bretford Manufacturing, https://www.bretford.com/solutions/charging-lockers/techguard-connect-10-bay/, retrieved May 31, 2022, 12 pages.
"5-Bay Charging Locker for Mobile Devices", Luxor Workspaces, https://www.luxorfurn.com/5-bay-charging-locker-for-mobile devices-1.html, retrieved May 31, 2022, 6 pages.

* cited by examiner

580

584 — IDENTIFY COMMUNICATION DEVICE

586 — ASSIGN MODULAR CHARGING UNIT

588 — LOCK COMMUNICATION DEVICE IN THE ASSIGNED MODULAR CHARGING UNIT

590 — CHARGE LOCKED COMMUNICATION DEVICE

592 — UNLOCK COMMUNICATION DEVICE

CHARGING STATIONS

CROSS-REFERENCE TO RELATED APPLICATIONS

This application claims priority to U.S. Provisional Application 63/195,252 filed on Jun. 1, 2021, which is incorporated by reference.

BACKGROUND

Controlled facilities such as a jail, prison, detention facility, secure hospital, and/or addiction treatment facility, can house large populations of individuals in confinement. Individuals such as inmates, prisoners, offenders, convicts, military personnel, patients, or others, may desire to communicate with individuals such as friends or family members located outside of the controlled facilities. Allowing such communication can be desirable. For instance, allowing communication between an individual in a controlled facility and a family member outside of the controlled facility may promote good behavior from the perspective of the controller facility. However, such communications may have security considerations and/or privacy considerations, among other considerations associated therewith.

DETAILED DESCRIPTION

Figure 1A:
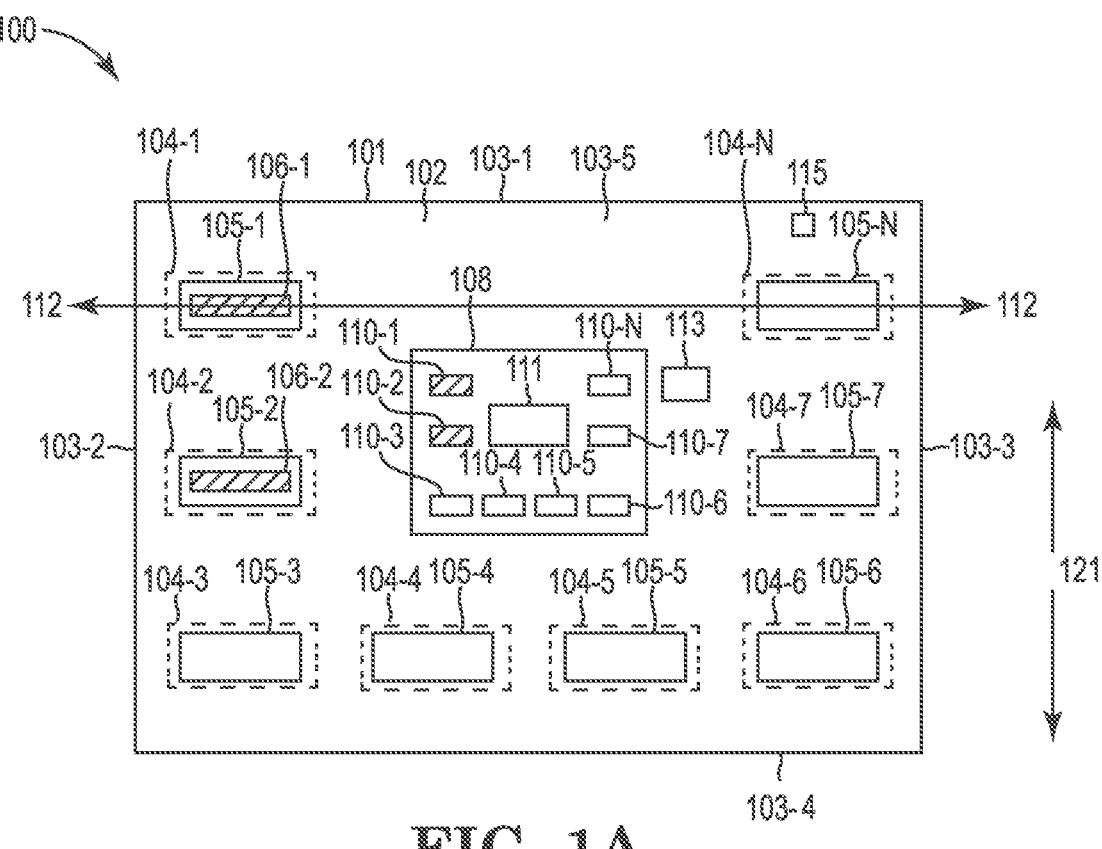
FIG. 1A illustrates a view of an example of a system including a charging station consistent with the disclosure.

As mentioned, controlled facilities such as a jail, prison, detention facility, secured hospital, and/or addiction treatment facility, can house large populations of individuals in confinement. Having a large number of individuals under confinement can present various administrative challenges.

For instance, in controlled facilities detained individuals such as inmates, prisoners, offenders, convicts, military personnel, patients, or other detainees, may desire to communicate with individuals (e.g., friends or family members) located outside of the controlled facilities. Allowing such communication can be desirable. For instance, allowing communication between an individual in a controlled facility and a family member outside of the controlled facility may promote good behavior from the perspective of the controller facility.

As such, some approaches employ communication devices (e.g., tablets, etc.) such as those assigned to a given individual (e.g., inmate) in a controlled facility. The individual communication devices may be a portable battery-based device. Thus, the communication devices can have a limited battery lifetime which permits the communication device to function as intended (e.g., permit video, audio, email, and/or text communication, etc.). As such, the individual communication devices may have to be periodically recharged to function as intended.

Yet, given the nature of controlled facilities, periodically recharging individual communication devices can be difficult and/or prone to issues. For instance, for safety and/or security reasons individuals in controlled facilities may not be granted access to wired charging equipment (e.g., power cords/power adapters/inductive charging equipment, etc.). As such, the individuals may not be able to charge their respective communication device.

Thus, some approaches may have an administrator (e.g., a guard) take physical possession of each individual communication device periodically (e.g., nightly) and subsequently charge the communication devices. However, such approaches are time-consuming, impart risk of injury for the administrator due to a need for close proximity with each respective individual in a controlled facility, and/or can present various security risks. As an example, a security risk can present due to an administrator having to handle and maintain a chain of custody for each individual communication device in multiple physical locations. Moreover, such approaches can result in multiple individuals touching communication devices and/or touching components such as doors/cables in an effort to charge the communication devices. Having multiple individuals touch communication devices and/or various components such as doors/cables can promote an unwanted spread of pathogens/germs (e.g., COVID-19), particularly when a large number (e.g., hundreds/thousands) of detained individuals and respective individual communication devices are located in the same controlled facility.

As such, the disclosure is directed to charging stations. Notably, charging stations can permit the use and effective charging (e.g., recharging) of individual communication devices, and yet can avoid any need for an administrator to periodically touch and/or facilitate the charging. Thus, charging stations, as detailed herein, can mitigate a risk of injury for the administrator, mitigate security risks, and/or mitigate the spread of pathogens/germs, in contrast to other approaches which do not employ charging stations (e.g., other approaches that instead rely on communal communication devices (e.g., a kiosk), that employ an administrator to physically touch and recharge individual inmate communication devices, that employed wired charging equipment/outlets, and/or that employ charging equipment with doors/handles.

Charging stations as detailed herein can provide a frame that includes bays. Modular charging units can be disposed in the bays. The modular charging units can be readily swappable and replaceable. For instance, a damaged modular charging unit that has been tampered with can be readily replaced with a new modular charging unit, as detailed herein.

Charging stations as detailed herein can include modular charging unit that do not include any exposed lengths of cables nor any exposed outlets (e.g., USB outlets, 120 volt outlets, etc.). Exposed lengths of cable and/or exposed outlets which, if present, could provide an avenue for a detained individual to tamper with, store contraband in, permit individual to harm themselves or others, and/or whose presence would otherwise be undesirable.

Modular charging units in a charging station can be assigned to a given individual to ensure the safe and secure storage of an individual communication device, as detailed herein. For instance, an individual communication device assigned to a given individual or individuals can be assigned to a given modular charging unit such that an administer can readily track a charging history of the individual communication device. For instance, examples herein provide for a RFID secure automated charging kiosk that permits storing, locking, and charging multiple communication devices in respective locking modular charging unit in the kiosk, as detailed herein. Accordingly, the secure RFID automated charging kiosk allows individuals in controlled facilities to manage the charging of their own individual communication devices. For instance, a plurality of communication devices can be disposed in the respective bays of the charging station and can be concurrently charged.

Charging stations as detailed herein can be obstruction-free. For instance, charging stations as detailed herein can be door-free, bar/gate-free, and/or handle-free. Stated differently, the charging stations can include modular charging units that do not include doors or other obstructions (e.g., bars/gates) which can selectively obscure at least a portion of the bays, but instead can employs a locking mechanism to secure an individual communication device in the modular charging unit. Having the charging stations be obstruction (e.g., door-free) and instead include a locking mechanism can be desirable in the controlled facility contest. For instance, doors, if present, would undesirably be prone to damage/breakage. Moreover, if present a door would obscure an area in the modular charging unit from view (e.g., when the door is closed) and thereby undesirably provide a hiding place for contraband.

Charging stations as detailed herein can permit a portion (but not all of) a communication device to protrude a distance out of a modular charging unit (and out of a bay). That is, at least due in part to being door-free a portion of a communication device can protrude a distance out of a modular charging unit, as detailed herein. Thus, the size of the modular charging unit (as compared to a size of a modular charging unit that would have to accommodate the entire communication device) can be reduced. Having a comparatively smaller sized modular charging unit can be desired in the controlled facility context for instance to reduce an amount of space which can potentially be employed to hide contraband. Moreover, having a portion of the communication device protrude can permit an officer or other individual to readily discern which modular charging units are being utilized and/or promote ease of use of the charging station (e.g., permitting an authorized individual to readily grasp and retrieve a communication device once fully charged and unlocked).

Charging stations as detailed herein can include horizontal bays (and horizontal modular charging units). Employing horizontal bays as opposed to other approaches such as those that employ vertical bays can provide various benefits in the controlled facility context. For instance, vertical bays may be more difficult to use and/or may provide obscured areas in which contraband may be stored, etc., as compared to horizontal bays and horizontal modular charging units having an interior volume that is readily visible to an administrator.

Charging stations as detailed herein can include a metal (e.g., steel) frame in which the locking charging bays are formed. In various embodiments, components included in the charging station are not visible and/or are not physically assessable from outside of the metal enclosure. For instance, an entirety of a circuitry board and an entirety of a power supply associated with the charging station can be disposed inside of a volume defined by the metal frame and thus can be inaccessible to an individual in a controlled facility.

Charging stations as detailed herein can include visual indicators that indicate a status (e.g., locked/unlocked/charging, etc. for each bay). For instance, a visual indicator (locked and/or charging) can be displayed.

FIG. 1A illustrates a (front) view of an example of a system 100 including a charging station 101 consistent with the disclosure. As illustrated in FIG. 1A, the system 100 can include the charging station 101 and a communication device such as a first communication device 106-1 and/or a second communication device 106-2 (collectively referred to herein as communication devices 106).

The charging station 101 includes a frame 102 (e.g., a housing). The frame 102 can be formed of a metal and/or a hardened plastic. For instance, in some embodiments the frame 102 can be formed of steel or another type of metal. The frame 102 can form an exterior surface of the charging station 101 and define an internal volume of the charging station 101. For instance, the frame 102 can include a first (e.g., top) surface 103-1, a second (e.g., side) surface 103-2, a third (e.g., side) surface 103-3, a fourth (e.g., bottom) surface 103-4, and a fifth (e.g., front) surface 103-5, among other surfaces such as those described herein. Various components are disposed in the internal volume of the charging station 101. As used herein, "disposed" means a location at which something is physically positioned. In various examples, bays, modular charging units, a power supply, a controller, among other possible components can be disposed inside a volume of the frame 102.

Figure 2:
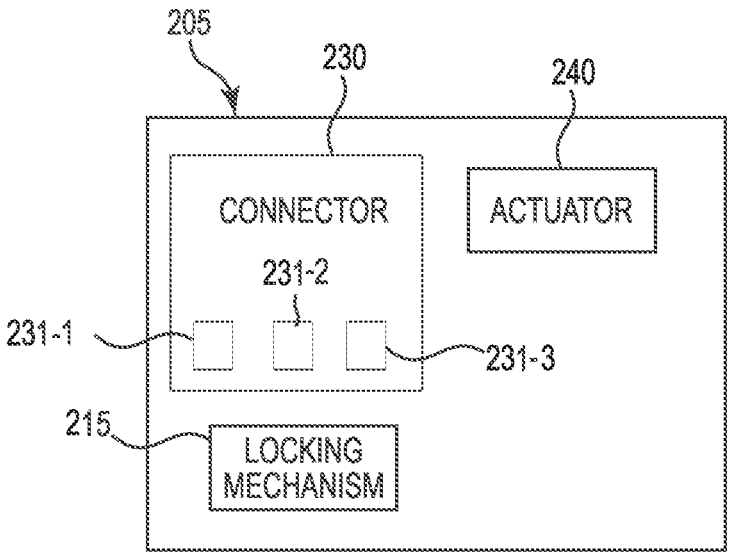
FIG. 2 illustrates an example diagram of a modular charging unit consistent with the disclosure.

The frame 102 can include or define a plurality of bays 104-1, 104-2, 104-3, 104-4, 104-5, 104-6, 104-7, . . . 104-N (collectively referred to herein as bays 104). As indicated in FIG. 1A, the bays 104 can be obscured by the frame 102 and/or the modular charging bays from a perspective of an outside viewer of the charging station 101. The bays 104 can include an opening in the fifth (e.g., front) surface 103-5. The bay can extend from the opening in the fifth surface 103-5 to a sixth (e.g., back) surface (e.g., sixth surface 203-6, as illustrated in FIG. 2) of the charging station 101.

Each of the bays 104 can be sized and configured to receive a modular charging unit, as detailed herein. For instance, an individual bay can be sized and configured to receive an individual modular charging unit. Each the bays 104 can be the same shape and same size. For instance, an interior volume of each of the bays 104 can be the same. Having each of the bays 104 be the same shape and same size can be beneficial in the controlled facility context for instance by easing monitoring and/or inspection of the bays 104. Moreover, having each of the bays 104 be the same shape and same size can promote use of modular charging units, as detailed herein, that that can readily be replaced in any one of the bays 104. However, in some examples at least a first subset of the bays 104 can be a different size and/or different shape than a second subset of the bays 104. The bays 104 can be rectangle, square, or other possible shapes.

A plurality of modular charging units 105-1, 105-2, 105-3, 105-4, 105-5, 105-6, 105-7, . . . 105-N (collectively referred to herein as modular charging units 105) can be disposed in the bays 104. Each modular charging units 105 can be disposed in and removably coupled to a respective bay of the bays 104. For instance, the fifth surface 103-5 and/or the sixth surface (e.g., sixth surface 203-6, as illustrated in FIG.

2) of the frame 102 can be removable to expose a coupling mechanism that removably couples the modular charging units 105 to the bays 104. Examples of coupling mechanisms include hexagonal bolts, star drive bolts, etc. Having the individual modular charging units be removably coupled to the bay 104 and/or frame 102 can permit the entire individual modular charging unit to be readily replaceable. For instance, an individual damaged modular charging unit that has been tampered with or is damaged can be readily replaced with a new modular charging unit, rather than having to remove/disable other modular charging units that are functioning as intended.

As detailed herein, the modular charging units 105 can each include a locking mechanism and a connector, among other possible components. The module charging units 105 can be employed to charge (provide electrical power to) communication devices 106, as detailed herein. Each of the modular charging units 105 can be the same shape and the same size. However, in some examples at least a first subset of the module charging units 105 can be a different size and/or different shape than a second subset of the modular charging units 105.

While a given quantity of bays 104 and modular charging unit 105 are illustrated in FIG. 1A, the quantity of bays 104 and/or the quantity of modular charging units 105 can be increased or decreased. For instance, a quantity of bays 104 and a quantity of modular charging units 105 can be increased or decreased by the same amount, among other possibilities.

The charging station 101 can include a graphical user interface 108. The graphical user interface 108 can be permit selection of icons, input of text, and/or other forms of communication with the charging station 101. For instance, the graphical user interface 108 can be a touch screen such as a liquid crystal display (LCD) which permits touch screen functionality, among other possibilities. The graphical user interface 108 can display various information associated with the charging station 101.

For instance, the graphical user interface 108 can display a real-time representation of which modular charging units 105 have a communication device disposed therein, which modular charging units are "free" (e.g., do not have a communication device disposed therein, and/or another status of the modular charging units (e.g., disabled, operating normally, communication device fully charged, communication device partially (e.g., 80%) charged, etc.), among other possible statuses.

The graphical user interface 108 can display text, a keyboard, and/or numerical representations via a portion 111 of the graphical user interface. For instance, the portion 111 can display a keyboard such as a QWERTY keyboard, among other possible types of keyboard layouts and/or other types of input devices.

The graphical user interface 108 can display a graphical status representation 110-1, 110-2, 110-3, 110-4, 110-5, 110-6, 110-7, . . . 110-N (collectively referred to herein as status representations 110) of each of the modular charging units 105. For instance, a first status representation 110-1 can indicate that a communication device is present in a first modular charging unit 105-1, as illustrated in FIG. 1. Similarly, a second status representation 110-2 can indicate that a communication device is present in a second modular charging unit 105-2. Conversely, each of a third status representation 110-3, a fourth status representation 110-4, a fifth status representation 110-5, a sixth status representation 110-6, a seventh status representation 110-7, and an eighth status representation 110-N can indicate that a communication device is not present in the respective modular charging units. Accordingly, the status representations 110 can provide a real-time status of each of the modular charging units 105 and/or a status of any of communication devices disposed in the modular charging units 105. Thus, a guard or other administrator can readily determine various status information associated with the charging station 101.

Alternatively, or in addition to the graphical user interface 108, each bay 104 and/or each modular charging unit 105 can have a respective corresponding mechanism to display status information. For instance, each bay can have a respective graphical user interface and/or lights (e.g., LED lights) to indicate a status representation associated with a respective modular charging unit in the bay and/or a communication device in the respective modular charging unit.

Figure 4:
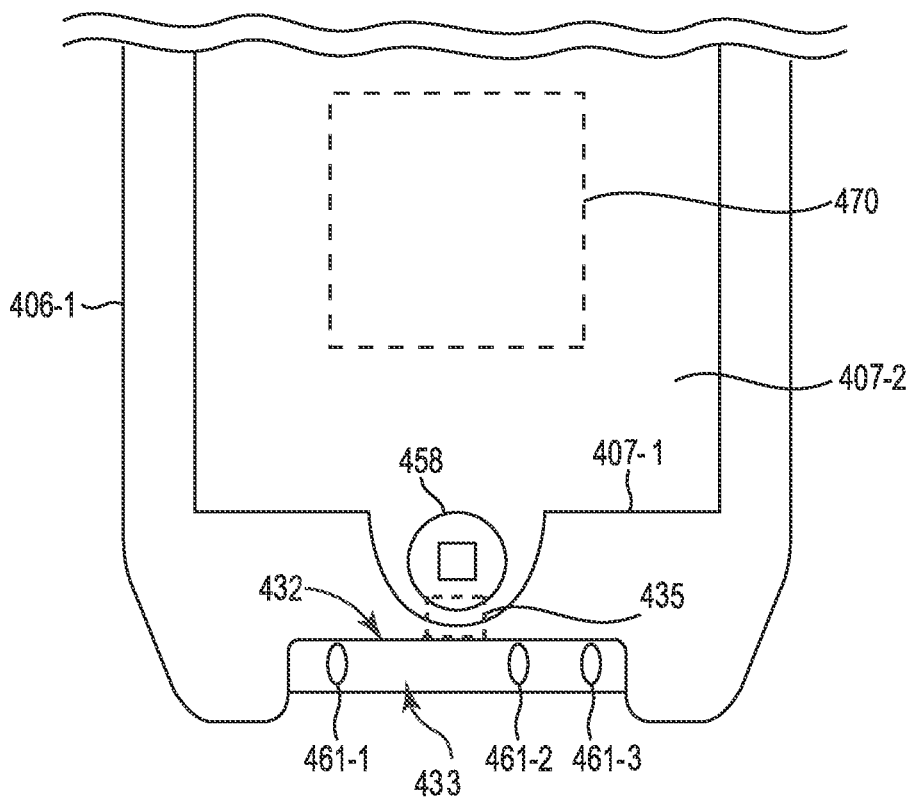
FIG. 4 illustrates an example of a portion of a communication device consistent with the disclosure.

The charging station 101 can include wireless communication component 113 such as a radio frequency identification (RFID) component, a near-field communication (NFC) component, a BLUETOOTH component, and/or a different type of component that permits wireless communication between the charging station 101 and a communication devices 106. For instance, the communication devices 106 can be brought within a given proximity of the charging station 101 and the wireless communication component 113 can permit wireless communication with a corresponding wireless communication component in the communication devices 106. In various examples, the wireless communication component 113 can be communication with a corresponding wireless communication component (e.g., wireless component 470, as illustrated in FIG. 4) that is present inside of an outer protective housing (e.g., REM) of the communication devices 106. For instance, the corresponding wireless component can be a RFID component such as a passive or active RFID component and the wireless communication component 113 can be a RFID component, among other possibilities.

The charging station 101 can include a locking device 115. The locking device 115 can lock the fifth surface 103-5 to a different surface of the charging station 101. The locking device 115 can be removable by a manufacture provided tool rather than a typical tool such as a wrench, screwdriver, etc. As such, the locking device 115 can ensure that an internal volume of the charging station 101 is not readily accessible to individual (e.g., inmates) in a controlled facility.

As illustrated in FIG. 1A, each bay of the bays 104 is door-free. Similarly, each modular charging unit of the modular charging units 105 is door-free. As used herein, being door-free refers to the absence of a door (e.g., being without a door). As used herein, a door refers to a hinged, sliding, and/or revolving barrier that can obscure at least a portion of a volume of a modular charging unit 105. That is, if present, a door may obscure at least a portion of an interior volume of a modular charging unit 105. For instance, when in a closed position a door, if present, may obscure some or all of an interior volume of a modular charging unit 105. Thus, having at least the modular charging units 105 be door-free can ensure that an interior volume inside of the modular charging unit 105 is readily viable to an administrator or guard, as compared to other approaches that employ doors and thereby are prone to the interior volume behind a door being used to hide contraband outside of the view of an administrator or guard.

In various examples, each module charging unit of the modular charging units 105 can be outlet-free, cable-free, or both. As used herein, being outlet-free refers to all interior surfaces of a modular charging unit and all externally visible surfaces (from the perspective of an individual in a controlled facility viewing the charging station 101) of the modular charging unit having an absence of a duplex outlet (e.g., a 120 volt outlet), USB port, and any other traditional electrical outlet. Similarly, as used herein, being cable-free refers to at least an interior volume of a modular charging unit having absence of an electrical cable such as a USB type-C cable, a Micro USB cable, among other types of electrical cables.

Having the modular charging units 105 be outlet-free and/or cable-free can be desirable in the controlled facility context. For instance, having the modular charging units 105 be outlet-free and/or cable-free mitigates a possibility of a detained individual to tamper with an outlet/cable, store contraband in an outlet/cable, permit the detained individual to harm themselves or others by way of unintended use of the outlet/cable. etc. In various examples, each modular charging unit of the modular charging units 105 are outlet-free and cable-free. In various example, each modular charging unit of the modular charging units 105 are outlet-free, cable-free, and door-free.

The communication devices 106 can permit various types of wireless communications (e.g., telephone call, text messaging, electronic mail (e-mail), video calls, and/or permit communication with the internet and/or various applications). For instance, the communication devices 106 can permit communication between individuals in a controlled facility and individuals (e.g., friends, family members, etc.) located outside of the controlled facility.

The communication devices 106 can include an electronic device (e.g., tablet, mobile phone, etc.) disposed in an electronic device housing. The device housing can include a rigid exterior member (REM) coupled to a semi-rigid interior member (SRIM) having deformation a channel between the REM and the SRIM. For example, electronic device housing can include a REM and a SRIM disposed within an internal volume of the REM, there SRIM including a cavity to house an electronic device, where the SRIM includes shock adsorbing spacers projecting from a main body of the SRIM to form a deformation channel between the REM and the main body of the SRIM. An electronic device such as a tablet or mobile phones can be disposed in the housing. Thus, the communication devices 106 can be amenable to use in controlled facilities at least by virtue of permitting electronic communications (e.g., between an individual in a controlled facility and another individual outside of the controlled facility) while mitigating or eliminating an ability of an inmate or other individual to damage the communication devices 106. While the communication devices 106 are described above as being hardened communication devices (e.g., including a deformation channel, a SRIM, and/or REM), in some instances, the communication devices 106 can be a tablet, a phone, and/or another type of communication device suitable to permit wireless electronic communications instead of a hardened device. Examples of suitable communication devices include those described in U.S. Pat. No. 10,082,835, the entire contents of which is hereby incorporated by reference.

Figure 1B:
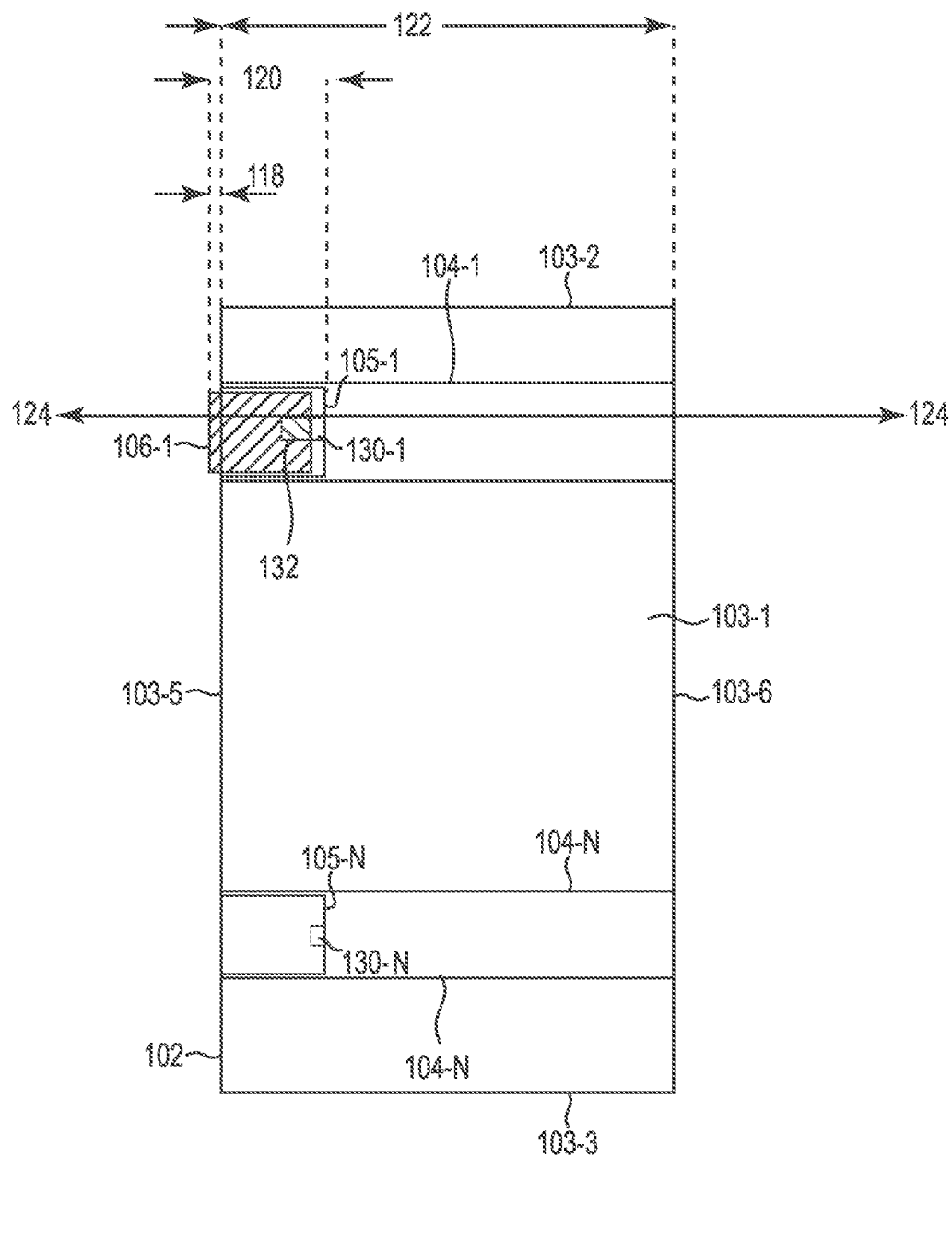
FIG. 1B illustrates another view of an example of a system including a charging station consistent with the disclosure.

FIG. 1B illustrates a section view (as taken along section line 112 in FIG. 1A) of an example of the system 100 including the charging station 101 consistent with the disclosure. As illustrated in FIG. 1B, the frame includes various surfaces such as the first surface 103-1, the second surface 103-2, the third surface 103-3, the fifth (e.g., front) surface 103-5, and the sixth surface 103-6. The sixth (e.g., back) surface 103-6 can be located on an opposite side of the frame 102 relative to the fifth (e.g., front) surface 103-5.

The bays 104 can be horizontal bays. For instance, the bays 104 and the modular charging units 105 can extend primarily in a horizontal direction 123 as illustrated in FIG. 1B, rather than a different direction such as a vertical direction 121 as illustrated in FIG. 1A. As mentioned, employing horizontal bays as opposed to other approaches such as those that employ vertical bays can provide various benefits in the controlled facility context. For instance, vertical bays may be more difficult to use and/or may provide obscured areas in which contraband may be stored, etc., as compared to horizontal bays having an interior volume that is readily visible to an administrator.

For instance, the bays 104 such as the first bay 104-1 and the eighth bay 104-N can extend a length 122 between the fifth surface 103-5 and the sixth surface 103-6 in the horizontal direction 123. The horizontal bays can be configured (e.g., are sized and shaped) to receive horizontal modular charging units 104 within at least a portion of a volume of the horizontal bays. For instance, as illustrated in FIG. 1B the first modular charging unit 105-1 is disposed in a portion 120 of the first bay 104-1. Similarly, the second modular charging unit 105-2 is disposed in a portion of the second bay 104-2. In various examples, the modular charging units 105 can be friction fit into the bays 104 and can be subsequently removably secured to the bays 104.

In various examples, a portion of a communication device disposed in a modular charging unit (e.g., a door-free modular charging unit) can protrude a distance out of the modular charging unit. For instance, as illustrated in FIG. 2, the first communication device 106-1 can protrude a distance 118 from an exterior surface (e.g., the fifth surface 103-5) of the frame 102. As mentioned, having a portion of the communication device protrude from the exterior surface of the frame 102 permits an individual in a controlled facility to readily physically access the communication device (e.g., once the communicate device is charged and unlocked), can reduce a size of the bay and thus can limits an amount of space available for potential misuse such as storage of contraband, etc. However, in some examples the communication device is included entirely in a volume of the modular charging unit and does not protrude a distance from an exterior surface of the frame 102.

Figure 1C:
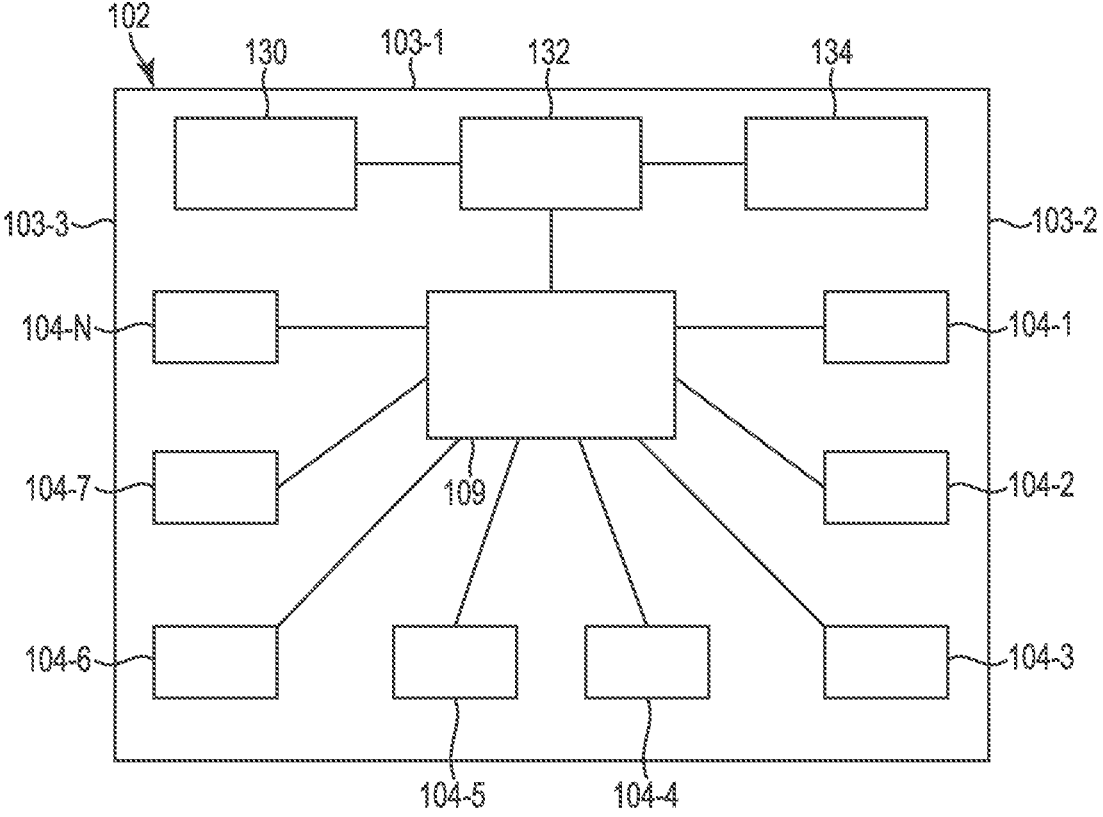
FIG. 1C illustrates yet another view of an example of a system including a charging station consistent with the disclosure.

FIG. 1C illustrates yet another (back) view of an example of the system 100 including the charging station 101 consistent with the disclosure. As illustrated in FIG. 1C, a surface such as the sixth surface (e.g., 103-6, as illustrated in FIG. 1B) can be removed to provide access to the bays 104 and the modular charging units 105, along with other components included in the charging station 101.

For instance, the charging station 101 can include a power outlet 132 that is disposed inside the frame of the charging station 101. That is, while illustrated as being visible in FIG. 1C, the power outlet 132 and various other components included in an internal volume of the charging station 101 can be typically hidden from view, for instance by the sixth surface when present. Thus, various components such as the power outlet 132 are not accessible and are not visible via a bay or otherwise to an individual in a controlled facility.

The power outlet 132 can provide power to a power supply such a first power supply 131 and a second power supply 134. The first power supply 131 and/or the second power supply 134 can provide electrical power to a controller 109, a wireless component (e.g., a wireless RFID component), a graphical user interface, among other electrical components included in the charging station 101. The first power supply 131 and/or the second power supply 134 can provide electrical power to the modular charging units 105.

That is, at least one of the power supply 130 and/or the power supply 134 can be coupled to each modular charging unit of the modular charging units 105.

The controller 109 can include hardware such as one or more integrated circuits and/or discrete components, a buffer memory, or a combination thereof. The hardware can include digital circuitry with dedicated (i.e., hard-coded) logic to perform the operations described herein. The controller 109 can be a microcontroller, special purpose logic circuitry (e.g., a field programmable gate array (FPGA), an application specific integrated circuit (ASIC), etc.), or other suitable processor.

The controller 109 can include a processor resource and a memory resource. The processing resource may be a central processing unit (CPU), a semiconductor based microprocessor, and/or other hardware devices suitable for retrieval and execution of machine-readable instructions stored in a memory resource. Processing resource may fetch, decode, and execute instructions. As an alternative or in addition to retrieving and executing instructions, processing resource may include a plurality of electronic circuits that include electronic components for performing the functionality of instructions.

The memory resource may be any electronic, magnetic, optical, or other physical storage device that stores executable instructions and/or data. Thus, memory resource may be, for example, Random Access Memory (RAM), an Electrically-Erasable Programmable Read-Only Memory (EE-PROM), a storage drive, an optical disc, and the like. Memory resource may be disposed within a charging station. Additionally and/or alternatively, memory resource may be a portable, external or remote storage medium, for example, that allows the charging station to download the instructions from the portable/external/remote storage medium.

The memory resource can be a non-transitory machine-readable medium. A machine readable storage medium may be any electronic, magnetic, optical, or other physical storage device that stores executable instructions. Thus, machine readable storage medium may be, for example, Random Access Memory (RAM), an Electrically-Erasable Programmable Read-Only Memory (EEPROM), a storage drive, an optical disc, and the like. The executable instructions may be "installed" on the charging station. The machine readable storage medium may be a portable, external or remote storage medium, for example, that allows the charging station to download the instructions from the portable/external/remote storage medium. In this situation, the executable instructions may be part of an "installation package". As described herein, the machine readable storage medium may be encoded with executable instructions related to inmate text communication.

FIG. 2 illustrates an example diagram of a modular charging unit 205 consistent with the disclosure. As illustrated in FIG. 2, the modular charging unit 205 can include a connector 230, a locking mechanism 215, as detailed herein, and an actuator 240, as detailed herein, among other possible components.

The connector 230 refers to circuitry that permits the communication of power and data between the modular charging unit 205 and a corresponding connector of a communication device. In some examples, the connector 230 can be an individual port configured to receive a unitary planer corresponding connector of a communication device.

The connector 230 can include a plurality of electrical contacts to permit communication of power and data to corresponding contacts of the corresponding connector of the communication device. For instance, the connector 230 can include at least one data pin or planar data contact 231-1 and at least one power pin or planar data contact 231-1 to couple to a corresponding power pin or planar power contact (e.g., planar power contact 461-1, as illustrated in FIG. 4) and at least one data pin or data contact (e.g., planar data contact 461-2, as illustrated in FIG. 4) in a corresponding connector. The connector 230 can include at least one ground data pin or data contact 231-3 to couple to a corresponding ground data pin or data contact in a corresponding connector. For instance, the connector 230 can include a planar data contact to couple to a corresponding planar ground contact (e.g., planar ground contact 461-3, as illustrated in FIG. 4). Notably, employing a planar data contact, a planar power contact, and a planar ground contact in the connector 230 (and a corresponding planar data contact, a planar power contact, and a planar ground contact in a corresponding connector) can mitigate the possibility of damaging the contacts due to misuse by individuals in an incarceration facility, as compared to other approaches that employ a pin or other non-planar circuitry to communicate data and/or power between components.

Figure 3A:
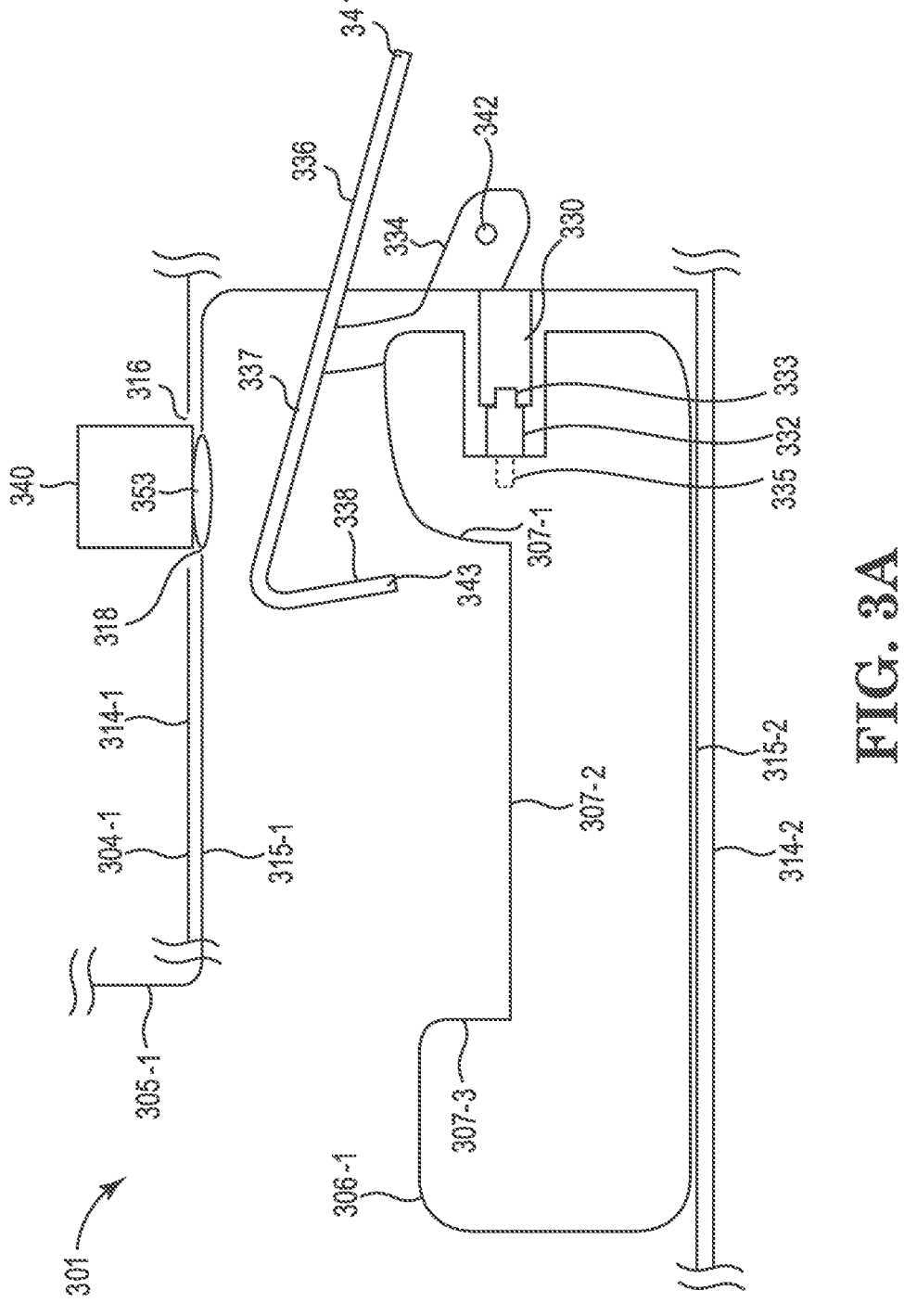
FIG. 3A illustrates an example of a portion of a charging station including a locking mechanism in a first position consistent with the disclosure.

FIG. 3A illustrates an example section view (as taken along section line 124 in FIG. 1B) of a portion of charging station 301 including a communication device 306 with a locking mechanism 336 in a first (unlocked) position consistent with the disclosure. As mentioned, a communication device 306-1 can be disposed in a modular charging unit 305-1. The modular charging unit 305-1 can include a first section 315-1 and a second section 315-1 that together form at least a portion of a housing of the modular charging unit 305-1. As illustrated in FIG. 3A, the housing of the modular charging unit 305-1 can include an opening 318.

Figure 3B:
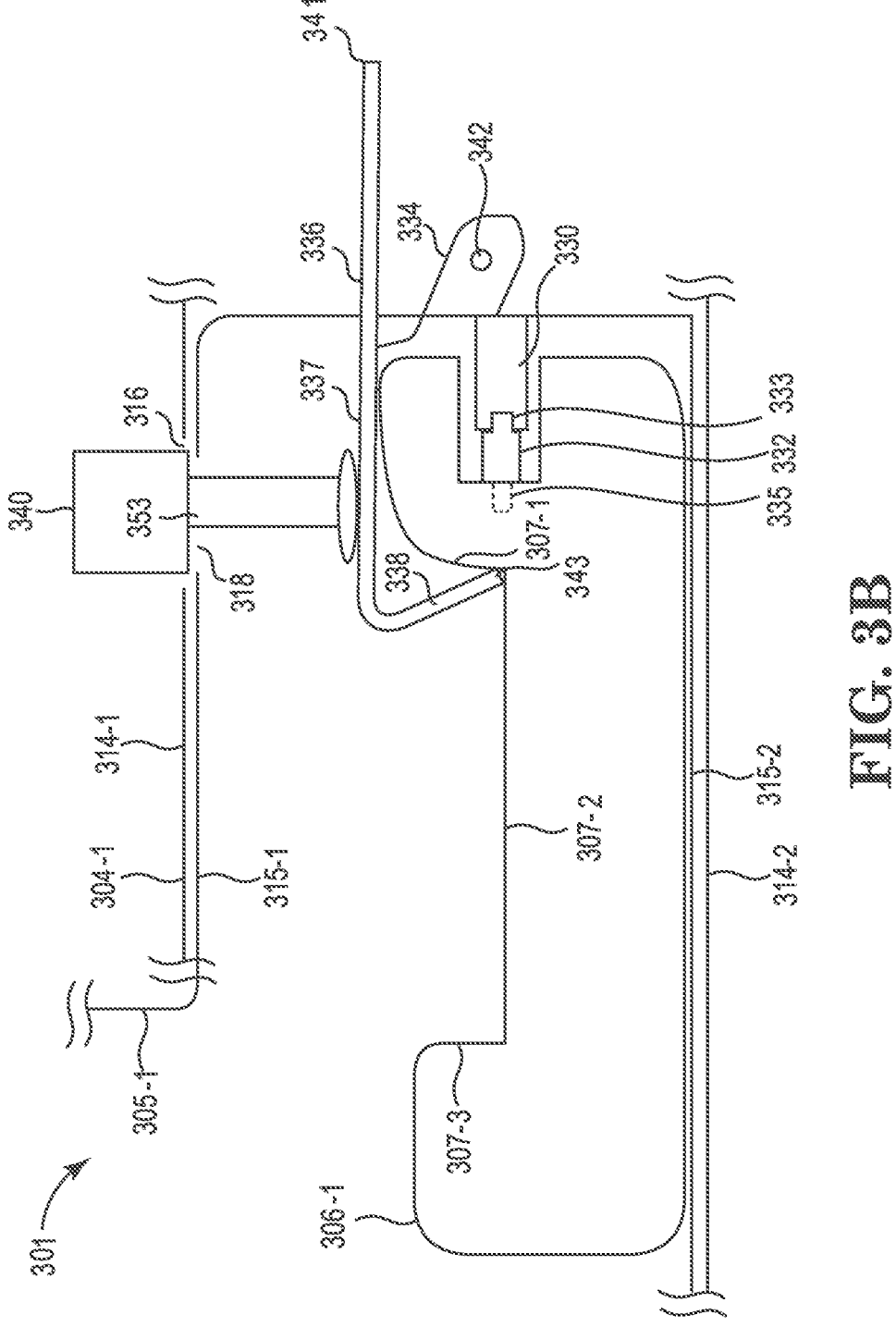
FIG. 3B illustrates an example of a portion of a charging station including a locking mechanism in a second position consistent with the disclosure.

As illustrated in FIG. 3A, at least a portion of the first section 315-1 and the second section 315-2 can be disposed in a bay 304-1. The bay 304-1 can include a first section 314-1 and a second section 314-2 that together form at least a portion of the housing of the bay 304-1. As illustrated in FIG. 3A, the housing of the bay 304-1 can include an opening 316. For instance, as illustrated in FIG. 3A and FIG. 3B, the opening 316 can be adjacent to the opening 318. Thus, the member 353 can be move through both openings 316, 318 to selectively contact the locking mechanism 336, as illustrated in FIG. 3B.

The charging station 301 can include an actuator 340 having a movable member 353. The actuator 340 can be coupled to the frame 302. For instance, the actuator 340 can be coupled to a bay. In various examples, each bay of a plurality of bays can include a respective actuator.

The member 353 can be shaft made of metal, plastic, and/or other types of materials. The member 353 can move (e.g., translate) between a first position and a second position. For instance, the member 353 can be selectively moved between a first position, as illustrated in FIG. 3A, at which the member 353 is not in physical contact with the locking mechanism 336 and a second position at which the member 353 is in physical contact with the locking mechanism 336. When at the second position, the member 353 can exert a force, via the locking mechanism 336, on the communication device 306-1 and thereby retain the communication device 306-1 in the modular charging unit 305-1.

As illustrated in FIG. 3A and FIG. 3B, the modular charging unit 305-1 can include a pivot point 342. In various examples, each of the modular charging units can include a respective pivot point. The locking mechanism 336 can be coupled, via an arm 334, to the pivot point 342. As such, the arm 334 and thus the locking mechanism 336 can rotate about the pivot point 342 between the first position (at which the locking mechanism 336 is not in physical contact with the communication device) and the second position (at which the locking mechanism is in physical contact with the communication device to exert the force on the communication device).

In some examples, the locking mechanism 336 can be dispositioned to the first position. For instance, the intrinsic weight of the locking mechanism or another component such as a spring or counterweight can disposition the locking mechanism 336 to the first position. Having the locking mechanism 336 be dispositioned to the first position can readily permit the communication device 306-1 to be unlocked from the modular charging unit 305-1, for instance, once the communication device 306-1 is recharged and an individual associated with the communication device is authenticated as being present at the charging station in which the modular charging unit 305-1 is included.

As mentioned, the modular charging unit 305-1 includes a connector 330. The connector 330 can be configured to receive a corresponding connector 332 of the communication device 306-1. For instance, the connector 330 can include in individual planar recess configured to receive a planar projection 333 of the corresponding connector 332, as illustrated in FIG. 3A and FIG. 3B. As illustrated in FIG. 3A and FIG. 3B, the connector 330 and the corresponding connector 332 are to be directly coupled in the absence of intervening components such as cables. The corresponding connector can include a first planar projection 333 and a second planar projection 335.

FIG. 3B illustrates an example section view (as taken along section line 124 in FIG. 1B) of a portion of charging station 301 including a communication device 306 with a locking mechanism 336 in a second (locked) position consistent with the disclosure. That is, FIG. 3B is analogous to FIG. 3A but illustrates the locking mechanism 336 in a second (locked) position.

As illustrated in FIG. 3A and FIG. 3B, the locking mechanism 336 can include a planar portion 337 and a hooked portion 338. As illustrated in FIG. 3B, when the locking mechanism 336 in the second (locked) position the member 353 can be in physical contact with part of the planar portion 337. That is, the member 353 of the actuator 340 is movable from the first position to the second position to contact the planar portion 337 and cause the locking mechanism 336 to rotate about the pivot point 342 from the first position to the second position. As such, the hooked portion 338 can contact a surface of the communication device when the locking mechanism 336 is in the second position, as illustrated in FIG. 3B. For instance, the planar portion 337 can include a first distal end 341 of the locking mechanism and the hooked portion 338 can include a second distal end 343 that is to contact a surface of the communication device when the locking mechanism in the second position. Having the distal end of the hooked portion 338 contact the surface an provide a desired retaining force and/or a desired retention angle such that the communication device is not removable (e.g., is not removable by application of manual force from an individual) from the modular charging unit 304-1 when the locking mechanism is in the second position and in contact with the surface of the communication device.

For instance, the communication device can include a first surface 307-1, a second surface 307-2, and a third surface 307-3, among other surfaces. In various examples, the first surface 307-1, the second surface 307-2, and/or the third surface 307-1 can be formed of an impact resistant material such as polycarbonate, as detailed herein. For instance, each of the first surface 307-1 and the third surface 307-3 can be formed of polycarbonate, among other possible materials.

As illustrated in FIG. 3A and FIG. 3B, the first surface 307-1 and the third surface 307-3 can be at an angle relative to the second surface 307-2. For instance, the second surface 307-2 can be a substantially 90 degree angle (+/−20 degrees) relative to the first surface 307-1 at an intersection between the second surface 307-2 and the first surface 307-1. Having the surfaces be a substantially 90 degree angle can promote retention of the communication device 306-1 in the modular charging bay 304-1, when the locking mechanism is in contact with a surface of the communication device 306-1.

The locking mechanism when in the second position can contact the first surface 307-1, the second surface 307-2, and/or the third surface 307-3. For instance, the distal end 343 of the locking mechanism 336, when at the second position, can be in physical contact with the first surface 307-1, the second surface 307-2, or both, to exert the force on the communication device 306-1 and retain the communication device in the bay 304-1. In some examples, the distal end 343 of the locking mechanism can contact both the first surface 307-1 and the second surface 307-2 at the same time. Having the locking mechanism contact both the first surface 307-1 and the second surface 307-2 at the same time can promote retention of the communication device 306-1 in the modular charging unit 305-1. However, in some examples, the locking mechanism can contact an individual surface such as the first surface or the second surface 307-2 in the absence of contact with a different surface.

FIG. 4 illustrates an example of a portion of a communication device 406-1 consistent with the disclosure. As mentioned, the communication device 406-1 can include various surfaces including a first surface 407-1 and a second surface 407-2. The second surface 407-2 can be a graphical user interface of the communication device 406-1 or can be protective cover or faceplate physically disposed on at least a portion of the graphical user interface of the communication device. For instance, physical access can be permitted via an opening in a faceplate to a portion of a GUI of the communication device. In such instances, an individual in a controlled facility may be unable to access portions of the communication device other than those (e.g., a portion of the GUI and/or a home key access 458) permitted by an opening in a faceplate.

As mentioned, the communication device 406-1 can include a corresponding connector 432 to couple to a connector in a modular charging unit. The corresponding connector 432 can include first planar tab 433 including a plurality of planar contacts including a first planar contact 461-1, a second planar contact 461-2, and a third planar contact 461-3 (hereinafter referred to collectively as planar contacts 461), among other possible quantities of planar contacts. In various examples, a quantity of the planar contacts 461 in the corresponding connector 432 can be equal to a quantity of planar contacts in a connector of the modular charging unit. The planar contacts 461 can permit transfer of power and data between the communication device 406-1. For instance, a planar power contact (e.g., planar contact 461-1) can permit power to be transferred from planar power contact in a connector in a modular charging unit to the communication device 406-1.

The corresponding connector 432 can include a second planar tab 435 that is to couple the corresponding connector to 432 to a port (not illustrated) in the communication device to permit the flow of data and/or power between the corresponding connector and the communication device (e.g., permitting charging of a rechargeable battery included in the communication device). For instance, the planar second tab 435 can couple to a micro USB port included in the communication device, among other possibilities.

As illustrated in FIG. 4, a wireless component 470 such as a RFID transmitter can be disposed in the communication device. For instance, the wireless component 470 can be a RFID chip or transmitter disposed between a SRIM and REM of the of the communication device 406-1, among other possibilities. Having the wireless component 470 disposed inside a housing of the communication device 406-1 can prevent any tampering/damage to the wireless transmitter 470 by individuals in a controlled facility, in contrast to other approaches which may employ FOBs and/or radio chipped cards (e.g., assigned FOBs and/or assigned radio chipped cards) to individuals and permit direct physical access to the FOBs and/or radio chipped cards.

Figure 5:
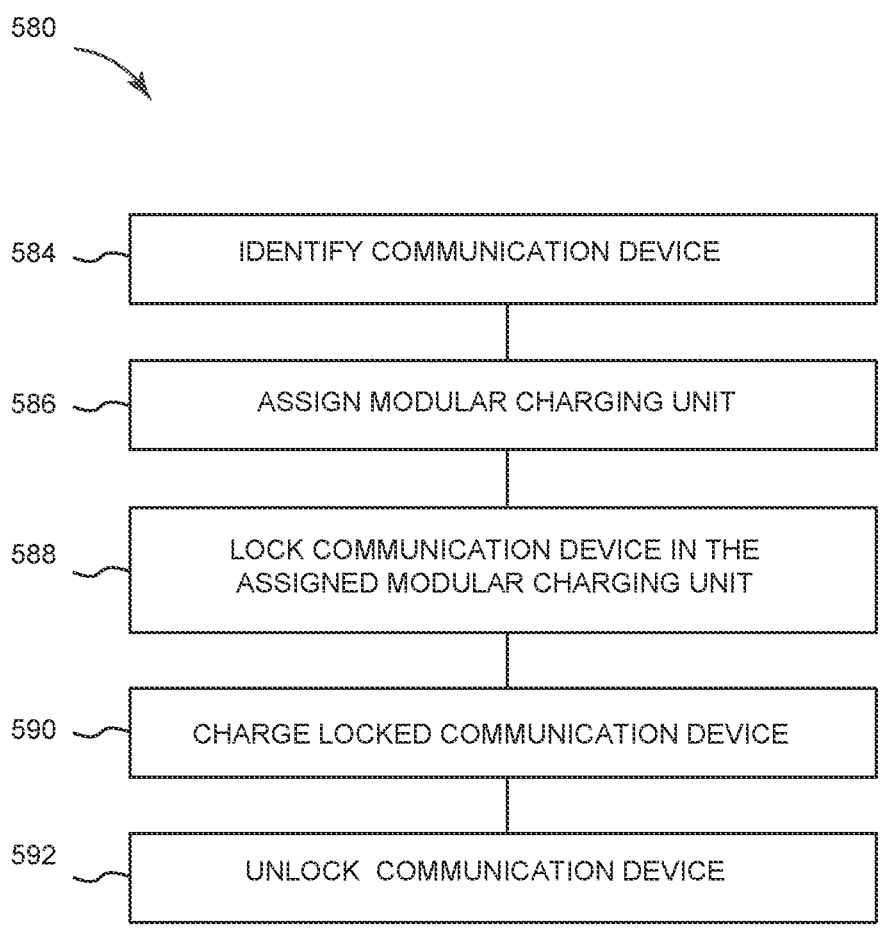
FIG. 5 illustrates an example of a method suitable with charging stations consistent with the disclosure.

FIG. 5 illustrates an example of a method suitable with charging stations consistent with the disclosure. For example, method 580 can be performed by an charging station (e.g., charging station 101, previously described in connection with FIG. 1) to charge communication devices. The method 580 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Method 580 can include displaying, by a user interface (e.g., a graphical user interface 108, described in FIG. 1) of the charging station, a keyboard or other mechanism to permit communication between the charging station and an individual in a controlled facility. The keyboard can be a QWERTY keyboard, and may be displayed such that an individual may input text or otherwise make selections, etc., via the graphical user interface 108.

At 584, an identity of the communication device can be determined. The identity of the communication device can be determined based on an input provided by an individual at a graphical user interface of the charging station and/or based on identifying information wirelessly transmitted from the communication device to the charging station, among other possibilities. For example, a wireless communication component, as detailed herein, can be a RFID reader configured to wireless communicate identifying information that can identify each communication device. That is, as detailed herein, charging stations can be permit automated locking and charging of multiple communication devices. In such examples, RFID equipped communication devices can gain access to the modular charging units by passing the communication device near the RFID reader. The RFID reader in the charging station can send a validation request and, responsive to which an individual (e.g., inmate) can provide a secure code specific to the individual that validates or invalidates the individual to recharge the communication device. That is, the identity of the communication device and/or the identity of the individual assigned the communication device can be compared to various information to determine whether or not the communication device and/or the individual assigned the communication device is permitted to recharge the communication (e.g., in the absence of further input by an administer such as a guard). In some examples, both an identify of the communication device and an identify of the individual assigned the communication device are determined (and validated) prior to permitting the communication device to be charged via a modular charging unit of the communication device. For instance, a communication device can be determined and validated based on wirelessly transmitted information or otherwise. Additionally, when inserting a communication device to be charged in a charging station an individual can be prompted to enter an individual (e.g., inmate) specific ID and/or PIN. The individual (e.g., inmate) specific ID and/or PIN can be entered via a graphical user interface of the charging station, among other possibilities. The entered information can be compared to stored information to determine and identify of an individual (e.g., to validate the individual to charge the validated communication device).

In some examples, the numbers on the keypad displayed via the graphical user interface of the charging station can be scrambled or arranged in different locations for each session with a different individual. Such rearranging of the keys (e.g., e.g., rearranging graphical representations of a numerical keypad) can provide enhanced security for instance by making it more difficult from another individual to determine what PIN an individual enters based on visual observation of the individual entering the PIN.

At 586, a modular charging unit can be assigned. For instance, an individual modular charging unit of a plurality of modular charging units included in a charging station can be assigned to a particular communication device. This permits the particular communication device to be inserted into modular charging unit, and subsequently to be charged, as detailed herein. For example, only assigned devices (assigned to inmates) can be entered into and charged in the modular charging units. Thus, even if a communication device (or other type of device) is inserted in a modular charging unit, the communication device will not be recharged or otherwise provided power in the absence of validation of the communication device and/or validation of an individual assigned to the communication device.

At 588, the communication device can be locked. For instance, a locking mechanism, as described herein, can lock the communication device in an assigned modular charging unit.

At 590, the locked communication device can be charged. For instance, the communication device can be charged responsive to authentication of the communication device based on the identification information, as detailed herein, a connector being coupled to a corresponding connector, as detailed herein, the communication device being locked (e.g., the actuator and the locking mechanism each being positioned at a second position). That is, in various examples, power supplied only subsequent to a communication device being authenticated, the device being coupled to a modular charging unit, and the communication device being locked in the modular charging unit. That is, if the communication device is unlocked, then power is not supplied to the communication device even if the device is authenticated and coupled to the modular charging unit.

At 592, a communication device can be unlocked. For instance, a recharged communication device can be unlocked responsive to authentication of an individual assigned the communication device being physically present at the charging station. The individual assigned to the communication device can be authenticated as being physically present at the charging station by entering a PIN or other individual specification information in a graphical user interface of the charging station and/or by use of a wirelessly transmitted information such as the individual presenting a RFID card or device when proximate to the charging station. In this way, the unauthorized removal of communication devices (e.g., by individual other than those assigned the communication device and/or other than by an administrator) can be prevented. For instance, when retrieving a device that is currently charging, an individual will either select the bay where their communication device is located at which point it will display the individual's name but not the individual's specific ID, or the individual will enter an individual specific ID and PIN. The charging unit will indicate which bay is charging the device and unlock the bay (e.g., cause an actuator to move to a first position) and thereby permit removal of the communication device from the bay.

In some examples, a time limit for removal of the communication device from the modular charging unit can be employed. The time unit can be configurable. For instance, an individual can have 10 seconds to remove (e.g., decoupled a connector from a corresponding connector) an unlocked communication device from a modular charging unit. In the event the time limit is exceed and that communication device has not been removed the charging station can relock the communication device in modular charging unit. Having such time limits can be desirable in the controlled facility context to prevent theft or other misuse of a communication device by individuals in the controlled facility.

As used herein, "logic" is an alternative or additional processing resource to perform a particular action and/or element described herein. Logic can include hardware. The hardware can include processing resources such as circuitry, which are distinct from machine-readable instructions on a machine readable media. Further, as used herein, "a" can refer to one or more such things.

The above specification, examples and data provide a description of the method and applications, and use of the system and method of the disclosure. Since many examples can be made without departing from the spirit and scope of the system and method of the disclosure, this specification merely sets forth some of the many possible example configurations and implementations.

What is claimed is:

1. A charging station comprising:
a frame defining a plurality of bays;
a plurality of modular charging units disposed in the plurality of bays, each modular charging unit adapted to receive a communication device at least partially therein, wherein each modular charging unit includes:
a connector for communicating power and data between the modular charging unit and the communication device when the communication device is present in the modular charging unit;
a locking mechanism; and
an actuator including a member that is movable between:
a first actuator position at which the member is not in physical contact with the locking mechanism and the locking mechanism does not prevent removal of the communication device from the modular charging unit; and
a second actuator position at which the member is in physical contact with the locking mechanism such that the locking mechanism exerts a force on a surface of the communication device, when present in the modular charging unit, for preventing the removal of the communication device from the modular charging unit;
and wherein the charging station is configured to supply power to the communication device only when the locking mechanism is in the second position.

2. The charging station of claim 1, wherein each modular charging unit further comprises a pivot point, wherein the locking mechanism is coupled via an arm to the pivot point, such that the locking mechanism rotates about the pivot point between a first position at which the locking mechanism is not in physical contact with the communication device and a second position at which the locking mechanism is in physical contact with the communication device to exert the force on the communication device.

3. The charging station of claim 1, wherein each modular charging unit is door-free.

4. The charging station of claim 1, further comprising a power supply coupled to the plurality of modular charging units to permit communication devices to be charged via power supplied from the power supply to each of the plurality of modular charging units.

5. The charging station of claim 1, wherein each modular charging unit is disposed in a bay and is removably coupled to the frame.

6. The charging station of claim 1, wherein each of the plurality of bays is a same shape and a same size, and wherein each of the plurality of modular charging units is a same shape and a same size.

7. The charging station of claim 1, wherein each modular charging unit is outlet-free.

8. The charging station of claim 1, wherein each modular charging unit is cable-free.

9. The charging station of claim 1, wherein the locking mechanism further comprises a planar portion and a hooked portion, wherein the hooked portion is adapted to contact a surface of the communication device for preventing the removal of the communication device from the modular charging unit.

10. The charging station of claim 2, wherein the locking mechanism further comprises a planar portion and a hooked portion, wherein the actuator is movable from the first actuator position to the second actuator position to contact the planar portion of the locking mechanism and cause the locking mechanism to rotate about the pivot point from the first position to the second position and cause the hooked portion to contact a surface of the communication device for preventing the removal of the communication device from the modular charging unit.

11. A system comprising:
a communication device; and
a charging station comprising:
a frame defining a plurality of bays; and
a plurality of modular charging units disposed in the plurality of bays, each modular charging unit adapted to receive the communication device at least partially therein,
wherein each modular charging unit includes:
a connector adapted to couple to a corresponding connector of the communication device and communicate power between the modular charging unit and the communication device when the communication device is inserted into the modular charging unit; and
a locking mechanism that is movable between a first position at which the locking mechanism is not in physical contact with the communication device when the communication device is positioned within the modular charging unit and a second position at which the locking mechanism is in physical contact with the communication device; and an actuator coupled to the frame, the actuator being selectively movable between:

a first position at which the actuator is not in physical contact with the locking mechanism; and a second position at which the actuator is in physical contact with the locking mechanism to exert a force, via the locking mechanism, on the communication device;

wherein the charging station is configured to supply power to the communication device only when the locking mechanism is in the second position.

12. The system of claim 11, wherein the communication device is a hardened wireless communication device including an outer protective housing including a first external surface and a second external surface, and wherein the locking mechanism, when at the second position, is in physical contact with the first external surface, the second external surface, or both, to exert the force on the communication device and retain the communication device in the bay of the plurality of bays.

13. The system of claim 12, wherein the locking mechanism further comprises a planar portion including a first distal end of the locking mechanism and a hooked portion including a second distal end of the locking mechanism.

14. The system of claim 13, wherein the second distal end of the locking mechanism, when at the second position, is in physical contact with the first external surface, the second external surface, or both, to exert the force on the communication device and retain the communication device in the bay of the plurality of bays.

15. The system of claim 11, wherein the communication device includes an RFID transmitter to transmit identification information to the charging station, and wherein the RFID transmitter is disposed inside of a housing of the communication device between a semi-rigid interior member (SRIM) and a rigid exterior member (REM).

16. The system of claim 15, wherein the charging station is adapted to charge the communication device responsive to all of:

authentication of the communication device based on the identification information received by the charging station;

the connector being coupled to the corresponding connector of the communication device; and the actuator being positioned at the second position to retain the communication device in the modular charging unit.

17. A system comprising:
a communication device; and
a charging station comprising:
a frame including a plurality of bays; and a plurality of door-free modular charging units disposed in the bays, wherein each of the door-free modular charging units includes:

a connector adapted to operatively couple to a corresponding connector of the communication device and communicate power between the modular charging unit and the communication when the communication device is inserted into the modular charging unit;

a pivot point;

a locking mechanism including a planar portion and a hooked portion, wherein the locking mechanism is rotatable about the pivot point between:

a first position at which a distal end of the hooked portion is not in physical contact with the communication device when the communication device is positioned within the modular charging unit; and a second position at which the distal end of the hooked portion is in physical contact with the communication device; and an actuator that is selectively movable between:

a first actuator position at which the actuator is not in physical contact with the locking mechanism; and a second actuator position at which the actuator is in physical contact with the planar portion and the distal end of the hooked portion is in contact with an external surface of the communication device to exert a force on the external surface of the communication device for preventing the removal of the communication device from the modular charging unit while the actuator is at its second actuator positions, wherein the charging station is configured to supply power to the communication device only when the locking mechanism is configured in the second actuator position and the communication device has been authenticated.

18. The system of claim 17, wherein:

the communication device is directly coupled, via the connector and a corresponding connector of the communication device, to the charging station; and a portion of the communication device disposed in one of the door-free modular charging units protrudes a distance away from an exterior surface of the frame.

19. The system of claim 17, wherein the charging station is configured to cause the actuator to relock the locking mechanism of the communication device after a time limit is exceeded by causing the locking mechanism to move from the second position to the first position after the time limit is exceeded.

20. The charging station of claim 1, further comprising a graphical user interface adapted for receiving input of identification information from a user, the graphical user interface adapted to display a keypad comprising numbers, wherein the arrangement of the numbers on the graphical user interface keypad is changeable for increased security.

* * * * *